United States Patent [19]
> Becher et al.

[11] 4,078,043
[45] Mar. 7, 1978

[54] PROCESS FOR PREPARING CALCIUM FLUORIDE FROM HEXAFLUORO SILICIC ACID AND PRODUCTION OF SILICIC ACID GEL OR ACTIVE SILICIC ACID FROM SAID CALCIUM FLUORIDE

[75] Inventors: Wilfried Becher, Heilbronn-Neckargartach; Joachim Massonne, Hannover, both of Germany

[73] Assignee: Kali-Chemie Aktiengesellschaft, Hannover, Germany

[21] Appl. No.: 750,624

[22] Filed: Dec. 15, 1976

Related U.S. Application Data

[62] Division of Ser. No. 550,135, Feb. 14, 1975, Pat. No. 4,031,193.

[30] Foreign Application Priority Data

Feb. 15, 1974   Germany .............................. 2407238

[51] Int. Cl.$^2$ ....................... C01F 11/22; C01B 33/14; C01B 33/16; C01B 7/22

[52] U.S. Cl. .................................... 423/335; 423/338; 423/490

[58] Field of Search ................ 423/490, 335, 338, 483

[56] References Cited

U.S. PATENT DOCUMENTS

| | | | |
|---|---|---|---|
| 2,780,523 | 2/1957 | Gloss | 423/490 X |
| 2,914,474 | 11/1959 | Hillyer et al. | 423/490 X |
| 3,551,332 | 12/1970 | Baumann et al. | 423/490 X |
| 3,907,978 | 9/1975 | Spreckelmeyer | 423/335 X |
| 4,031,193 | 6/1977 | Becher et al. | 423/490 |

FOREIGN PATENT DOCUMENTS

| | | | |
|---|---|---|---|
| 548,088 | 10/1957 | Canada | 423/490 |
| 1,580,578 | 9/1969 | France | 423/490 |

*Primary Examiner*—Edward Stern
*Attorney, Agent, or Firm*—Bacon & Thomas

[57] ABSTRACT

Disclosed is a process for the preparation of calcium fluoride comprising reacting hexafluoro silicic acid with calcium carbonate in the presence of sulfate or aluminum ions within a pH range of between about 2 and 6 and separating the calcium fluoride precipitate from the resulting aqueous silica sol.

13 Claims, No Drawings

PROCESS FOR PREPARING CALCIUM FLUORIDE FROM HEXAFLUORO SILICIC ACID AND PRODUCTION OF SILICIC ACID GEL OR ACTIVE SILICIC ACID FROM SAID CALCIUM FLUORIDE

This is a division of application Ser. No. 550,135 filed Feb. 14, 1975 now U.S. Pat. No. 4,031,193 issued June 21, 1975.

BACKGROUND OF THE INVENTION

The present invention relates to the production of calcium fluoride and more especially, to the preparation of calcium fluoride from hexafluoro silicic acid.

In the past several years several processes have become known which make possible the preparation of hydrogen fluoride, the most important starting material compound in fluorine chemistry, from fluorosilicic acid. As far is known, however, none of these processes is being commercially practiced. The reason for this is to be seen in the high process costs.

For example, there are already known processes according to which calcium fluoride can be obtained from fluorosilicic acid by reaction with calcium carbonate $CaCO_3$ or calcium hydroxide $Ca(OH)_2$. In this regard, U.S. Pat. No. 2,780,521 and No. 2,780,523 describe the reaction of diluted fluorosilicic acid having a content of between 2.5 and 3.8% of $H_2SiF_6$ with lime, according to the reaction equation

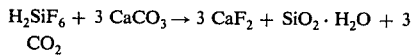

If the reaction is carried out in a pH range of 3.5–6.7 (according to claim 2 preferably in the range 5.5–6.5), calcium fluoride $CaF_2$ is said to be separable in an easily filterable form from the concurrently produced $SiO_2$-sol.

A considerable disadvantage of the process in accordance with the first-mentioned patent resides in the fact that there is obtained a calcium fluoride product which contains between 4 and 7% $SiO_2$ as an impurity. Such a material has little suitability for the production of hydrogen fluoride.

In accordance with the second patent, there is obtained a calcium fluoride product having only a small content of $SiO_2$ (about 0.5% and less). This is said to be accomplished by providing that not more than 85% of the amount of calcium carbonate $CaCO_3$ stoichiometrically required for the formation of calcium fluoride is added to the diluted silicic acid. After filtration of the product obtained in this manner, the filtrate is once more treated with calcium carbonate until a pH value of between 7 and 7.3 has been achieved. The product yielded in this step constitutes a mixture of calcium fluoride and calcium silicofluoride which is not useable. In addition to this disadvantage of the process, a further disadvantage is to be seen in the fact that relatively long action periods of approximately 30 minutes to two hours are required in connection with the process.

An especially considerable weakness of both processes set forth in the foregoing United States patents resides, however, in the fact that only relatively strongly diluted fluorosilicic acid, maximum concentration 4–6%, may be employed. The reason for this may be traced back to the known phenomenon that silica salts are unstable and depending upon parameters such as pH value, temperature, time, and foreign ion content tend toward separation of $SiO_2$ with concurrent gel formation.

Accordingly, the industrial production of hydrogen fluoride still proceeds today exclusively from natural fluor spar which is reacted in the form of the so-called acid grade spar with more than 97% calcium fluoride $CaF_2$.

There exists, therefore, a definite need to convert into calcium fluoride the fluoro silicic acid produced as a by-product in ever increasing amounts during the production of super phosphates and wet phosphoric acid. In this manner, the fluoride obtained in such a form can be immediately converted to hydrogen fluoride in existing industrial installations. Moreover, calcium fluoride represents an unproblematic fluorine reserve, since it may be safely deposited in piles.

SUMMARY OF THE INVENTION

It is therefore an object of the present invention to provide a process for the production of calcium fluoride.

A further object of the present invention resides in the provision of a process for preparing calcium fluoride from fluorosilicic acid.

It is also an object of the present invention to provide a process for producing calcium fluoride from fluoro silicic acid produced as a by-product in the production of super phosphates and wet phosphoric acid.

It is likewise an object of the present invention to provide a process for producing calcium fluoride which is suitable for the production of hydrogen fluoride.

Yet a further object of the invention resides in the provision of a process for the production of calcium fluoride from fluorosilicic acid which permits the aqueous silicic acid sol obtained as a by-product to be utilized for the preparation of silica gel, active silicic acid or calcium or magnesium silicate, respectively.

In accomplishing the foregoing and other objects, there has been provided in accordance with the present invention a process for the preparation of calcium fluoride from hexafluorosilicic acid which comprises the steps of reacting the silicic acid with calcium carbonate, preferably in the form of an aqueous suspension, at a pH value of between about 2 and 6, preferably between about 3 and 5, and in the presence of sulfate and/or aluminum ions, whereby a calcium fluoride precipitate and an aqueous silica sol are formed, and thereafter separating the calcium fluoride precipitate from the aqueous silica sol. Typically, the mole ratio of sulfate ion to hexafluoro silicic acid is between about 1:2 and 1:70, and preferably ranges from about 1:5 to 1:20, whereas the molar ratio of aluminum ion to hexafluorosilicic acid typically ranges between about 1:7 and 1:100, and preferably between about 1:10 and 1:30. After separation of the precipitate, it is preferably washed with water and dried.

The sulfate and/or aluminum ions may be added either to the calcium carbonate suspension or to the hexafluorosilicic acid. Sulfate ions may be introduced in the form of sulfuric acid, calcium sulfate, iron-II-sulfate, iron-III-sulfate, magnesium sulfate or alkali metal sulfate. Typical aluminum salts suitable for providing aluminum ions include aluminum sulfate, aluminum chloride, aluminum nitrate, alkali alums and basic salts of aluminum.

In accordance with one aspect of the invention, the process is carried out by adding the hexafluorosilicic acid to a calcium carbonate suspension at a controlled rate sufficient to maintain the pH at a value between about 4 and 5, and then permitting the pH to fall to a value between about 3 and 3.5 at the end of the reaction by adding a small quantity of hexafluorosilicic acid.

There is also provided in accordance with the invention a process for the production of hydrogen fluoride, which comprises the steps of producing calcium fluoride set forth hereinabove together with the step of converting calcium fluoride to hydrogen fluoride. The invention also provides a method for producing silica gel, active silicic acid or calcium or magnesium silicate comprising converting the aqueous silicic acid sol produced as a by product in the abovedescribed process to the desired product.

DETAILED DESCRIPTION OF PREFERRED EMBODIMENTS

In contra-distinction to prior art processes, the process of the present invention makes possible the use of hexafluorosilicic acid of high concentration, for example, having a concentration of 10 to 40%. In spite of this high concentration, a calcium fluoride product is produced which is entirely suitable for the production of hydrogen fluoride in accordance with conventional processes. At the same time, silicic acid sol is produced in such a concentration that its conversion into silicic acid gels, active silicic acid or the respective calcium or magnesium silicate is economically feasible.

The precipitation of the silica sol obtained in accordance with the invention with either calcium oxide or magnesium oxide in aqueous suspension has proven to be especially advantageous. The precipitation products are easily filterable and after drying represent fillers having excellent properties for synthetic resins, rubber, paints and paper.

The process of the present invention permits avoidance of the disadvantages of the previously known processes, particularly in the sense that the time period required for the reaction and subsequent separation of the calcium fluoride precipitate formed is significantly shortened by means of suitable additives. These additives, which are introduced in the form of sulfuric acid, sulfates or aluminum salts, furthermore yield the result that the calcium fluoride formed in the reaction also exists in a form which is extremely easy to filter, even if the hexafluorosilicic acid available for use is of comparatively high concentration. In this instance, the maintenance of a favorable pH range must be given special attention during the reaction so that there is not too much deviation from the region of optimal stability for silicic acid sol (pH 3.0–3.3). This can be accomplished, for example, by providing that the calcium carbonate is present as an aqueous suspension and that the hexafluorosilicic acid is added to the suspension under conditions of agitation at such a rate that a pH value of between about 4 and 5 is maintained during the extent of the reaction. The pH value is then permitted to drop to a value of between about 3 and 3.5 at the end of the reaction by adding a small quantity of hexafluorosilicic acid.

As a result of these measures, silicic acid sols can be obtained after separation of the precipitate having a $SiO_2$ content up to 6%, whereas the calcium fluoride precipitate contains after drying at most between about 2 and 3% $SiO_2$, and typically only between about 1 and 2%.

While the preferred pH range for the present reaction lies within the broad limits which are set forth in U.S. Pat. No. 2,780,521 (approximately 3.5–6.7), the preferred range for the present invention is entirely different from the preferred range set forth in the patent (approximately 5.5–6.5). According to the method of working the process of the present invention, the pH range between 3 and 5 is more favorable because in this range the silicic acid does not tend so quickly toward aggregation with gel formation as is the case at higher pH values.

As additives for acceleration of the precipitation of an easily filterable calcium fluoride precipitate there are employed according to the present invention compounds containing sulfate ions and also aluminum salts. Sulfuric acid and calcium sulfate are particularly suitable for this purpose, since they contaminate the resulting calcium fluoride only with calcium sulfate, which is present in any event during the further processing to hydrogen fluoride. Other metal sulfates may also be employed, especially those from di- and tri-valent iron, aluminum and magnesium and also the alkali metals. In some respects they are superior in their influence upon the filterability of the calcium fluoride precipitate in comparison to sulfuric acid and/or calcium sulfate; however, on the other hand they occasion a more or less undesirable contamination on the secondary products, i.e., the silicic acid sol or the anhydride resulting during the production of hydrogen fluoride. Aluminum salts such as, for example, aluminum sulfate, aluminum chloride, aluminum nitrate, alkali alums and basic salts of aluminum are also particularly effective as additives.

The process according to the present invention can be carried out according to different methods. For example, analogous to the above-cited U.S. patents, the calcium carbonate can be added to the sulfate- or aluminum-containing hexafluoro silicic acid, or the calcium carbonate can be suspended with water and the additives according to the present invention can be added to the suspension. The reaction may then be carried out in such a manner that the suspension and the hexafluoro silicic acid are continuously added to a reaction container.

As pointed out hereinabove, the additives are normally added to the calcium carbonate suspension. If sulfuric acid is chosen as the additive, then it is advantageous to mix the sulfuric acid in the form of dilute acid with the hexafluorosilicic acid. In this instance, it is also possible to employ diluted waste sulfuric acid, as long as it does not contain any impurities which will disturb the present reaction. The best results are obtained when additives containing sulfate ions are employed in a molar ratio of $SO_4$ to hexafluorosilicic acid between about 1:1 and 1:70, preferably between about 1:5 and 1:20. Additives containing aluminum ions are typically employed in a molar ratio of aluminum to $SiF_6$ between about 1:7 and 1:100, and preferably between about 1:10 and 1:30.

It is preferred to carry out the process of the present invention within a temperature range of about 5° to 30° C., although temperatures above 30° C. may be employed for carrying out the reaction.

In another embodiment of the invention, a further step is carried out wherein the silica sol obtained after separating the calcium fluoride precipitate is further precipitated with calcium oxide or magnesium oxide.

In comparison to the known state of the art, the production of calcium fluoride from hexafluorosilicic acid in the presence of the specified additives according to the invention represents a novel development in the sense that the degree of crystallinity, and thus, the filterability of the calcium fluoride precipitate has not heretofore been achieved, not even when the hexafluorosilicic acid is used in highly diluted form. It is furthermore surprising that the additives in the provided amounts do not affect the stability of the $SiO_2$ sol, so that substantially $SiO_2$-free calcium fluoride precipitate can be obtained.

The foregoing description and the following examples relate to several specific embodiments of the present invention, and it is to be understood that this description is intended to be illustrative only and not in any sense limitative. It is not intended to exclude other possible embodiments which permit carrying out the reaction utilizing the additives of the present invention.

EXAMPLE 1

A suspension of 303 grams of finely pulverized calcium carbonate in one liter of water is prepared in a two liter beaker. To this suspension a mixture of 391 grams of hexafluoro silicic acid containing 35% $H_2SiF_6$ and 30 grams of sulfuric acid containing 50% $H_2SO_4$ is added from a dropping funnel over a period of ten minutes under conditions of agitation.

During the reaction, a pH value of about 4.5 is determined, and the pH drops to 3.5 after the end of the reaction. Both reaction components have a temperature of 18° C. at the beginning of the reaction.

After complete addition of the acid mixture, a further period of 5 minutes is permitted to pass with continuing agitation, until the reaction mixtures give off no more carbon dioxide. Next, the precipitate is subjected to suction filtration on a porcelin filter funnel of 15 cm diameter with the use of a Nr.589/2 round filter (available from Schleicher & Schuell). The vacuum is produced with an aspirator and reaches a final value of about 27 mbar. Under these conditions, the filtration time is 6 minutes.

The precipitate is washed with 550 grams of water and before drying has a weight of 514 grams. After several hours of drying at 120° C., 253 grams of precipitate are obtained. The analysis shows a content of 42.9% F and 1.05% $SiO_2$. It is not possible to detect carbonate in the product. The filtrate has a weight of 1,045 grams and contains 5.2% $SiO_2$ and 80 ppm of fluorine.

COMPARATIVE EXAMPLE

Under conditions identical in all respects with those of Example 1, 303 grams of calcium carbonate are allowed to react with 410 grams of hexafluorosilicic acid (35% $H_2SiF_6$). The gelatinous calcium fluoride $CaF_2$ precipitate can be separated from the silicic acid sol only partially by filtration, as a result of which after approximately 1 hour 730 grams are obtained. The filter residue contains large amounts of silicic acid gel.

EXAMPLE 2

3.0 grams of calcium sulfate $CaSO_4 \cdot \frac{1}{2} H_2O$ are added to a suspension of 30.3 grams of $CaCO_3$ in 200 ml of water, and under conditions of stirring, 43 grams of $H_2SiF_6$ (33.5%) are added in five minutes. After ten minutes of reaction time, a pH value of 3 is registered. The precipitate is subjected to suction on a filter of 11 cm diameter under identical conditions as in Example 1, for which a filtration time of 1 minute is necessary. The dried precipitate contains 42.6% fluorine and 0.68% $SiO_2$.

EXAMPLE 3

2.9 grams of aluminum sulfate $Al_2(SO_4)_3 \cdot 18 H_2O$ are added to a suspension of 30.3 grams of calcium carbonate in 100 ml. of water, and over a period of 8 minutes 43 grams of $H_2SiF_6$ (33.5%) are dropped therein under conditions of agitation. Thereafter, the reaction mixture is agitated for a further 5 minutes, and after cessation of $CO_2$ development, a pH value of 3 is measured.

The precipitate is handled as in Example 2, and a filtration time of 30 seconds is required. The analysis of the dried calcium fluoride precipitate results in 42.5% F., 1.83% $SiO_2$ and 1.64% $Al_2O_3$.

EXAMPLE 4

Example 3 is repeated with the exception that in place of the aluminum sulfate, 0.9 grams of basic aluminum chloride (analysis: 29.5% $Al_2O_3$, 27.35% Cl, 6.64% $SO_4$) is used as the additive. The filtration time is approximately 30 seconds under the conditions specified in Example 2. After drying, 46.5% F., 3.2% $SiO_2$ and 1.1% $Al_2O_3$ is found.

EXAMPLE 5

Example 3 is repeated except that 1.75 grams of iron sulfate $FeSO_4 \cdot 7 H_2O$ is employed instead of the aluminum sulfate. Under otherwise comparable conditions, a filtration time of 30 seconds is measured. After drying, the residue weighs 20.8 grams and contains 44.1% F., 1.4% $SiO_2$ and 1.9% $Fe_2O_3$.

EXAMPLE 6

The procedure of Example 3 is repeated except that aluminum sulfate is replaced by one gram of sodium sulfate $Na_2SO_4$. Utilizing the working conditions described in Example 3, filtration of the precipitate requires 25 seconds. The product has the following analysis: 44.0% F, 3.7% $SiO_2$, 0.22% Na.

EXAMPLE 7

1200 g. of ground limestone, containing 0.86% $SiO_2$, having a particle size of less than 0.05 mm is suspended with 4000 g. of tap water, and 120 g. of 50% $H_2SO_4$ are added thereto with stirring. 500 ml. of tap water are placed in a stirrer vessel (I) of 1 liter size with overflow. About 2.3 l./hr. of the $CaCO_3$ suspension and approximately 0.78 l./hr. of aqueous fluorosilicic acid (22.1% by wt. F) are added simultaneously with stirring, with the addition of fluorosilicic acid being regulated so that a pH value of 3 is maintained in the stirring vessel (I). After 14 minutes, the contents level in vessel (I) reaches the overflow. The reaction mixture flows — corresponding to the addition of $CaCO_3$ suspension and fluorosilicic acid — into a similar stirring vessel (II). In this vessel also, an average duration of 14 min. is provided by the corresponding height of the overflow pipe.

The $CaF_2$ suspension flowing out of vessel (II) is led to a filter funnel which is changed every 30 min. After each change, the filter residue is washed with 500 ml. of water and dried at 120° C.

The following table shows the $SiO_2$ and $CaCO_3$ content of the dried $CaF_2$ residue.

| Test duration (hr) | Residue (wet) (g) | Residue (dried at 120° C.) (g) | % SiO$_2$ | % CaCO$_3$ |
|---|---|---|---|---|
| 0.5 | 281 | 160 | 1.7 | 6.3 |
| 1.0 | 411 | 247 | 1.8 | 5.3 |
| 1.5 | 390 | 233 | 1.8 | 1.8 |
| 2.0 | 303 | 200 | 1.9 | 1.9 |
| 2.5 | 350 | 220 | 1.8 | 1.9 |

The test shows that, with continuous and simultaneous supply of the starting materials, constant values of SiO$_2$ and CaCO$_3$ appear in synthetic fluor spar after a short reaction period.

What is claimed is:

1. A process for the production of calcium fluoride, comprising the steps of reacting hexafluorosilicic acid having a concentration of between 10 to about 40% by weight with calcium carbonate in the presence of aluminum ion in a molar ratio of aluminum to hexafluorosilicic acid of between about 1:7 and 1:100 at a pH between about 2 and 6, whereby the aluminum ion provides for the formation of an easily separable mixture of calcium fluoride precipitate and aqueous silica sol, and separating said calcium fluoride precipitate from said silica sol.

2. The process as defined in claim 1, wherein said calcium carbonate is present as an aqueous suspension.

3. The process as defined by claim 1, wherein said pH is within the range of from about 3 to 5.

4. The process as defined by claim 1, wherein said molar ratio of aluminum to hexafluoro silicic acid is between about 1:10 and 1:30.

5. The process as defined by claim 1, further comprising the steps of washing said separated calcium fluoride precipitate with water and drying.

6. The process as defined by claim 1, wherein said ion is added first to said hexafluorosilicic acid prior to reaction with said calcium carbonate.

7. The process as defined by claim 2, wherein said ion is added to said aqueous suspension of calcium carbonate prior to reaction with said hexafluorosilicic acid.

8. The process as defined by claim 1, wherein said ion is aluminum ion which is added in the form of an aluminum salt.

9. The process defined by claim 1, wherein said aluminum salt is aluminum sulfate.

10. The process as defined by claim 1, wherein said step of reacting hexafluorosilicic acid calcium carbonate is carried out by adding said hexafluorosilicic acid to said calcium carbonate at a controlled rate sufficient to maintain the pH at a value between about 4 and 5 during the extent of the reaction.

11. The process as defined by claim 2, further comprising the steps of continuously and simultaneously introducing the aqueous suspension of calcium carbonate and the hexafluoro silicic acid to said reaction.

12. The process as defined by claim 1, further comprising the step of precipitating with calcium oxide or magnesium oxide said silica sol obtained after separating said calcium fluoride precipitate.

13. A process for the production of silicic acid gel or active silicic acid, comprising the steps of preparing calcium fluoride in accordance with the process defined by claim 1, whereby an aqueous silicic acid sol is produced as a by-product and converting said aqueous silicic acid sol to silicic acid gel or active silicic acid.

* * * * *